US006562451B2

(12) United States Patent
Syoda et al.

(10) Patent No.: US 6,562,451 B2
(45) Date of Patent: May 13, 2003

(54) COATED FILM

(75) Inventors: Yoshihisa Syoda, Ibaraki (JP); Hisashi Tani, Ibaraki (JP); Hiroo Hayashi, Ibaraki (JP)

(73) Assignee: Oji-Yuka Synthetic Paper Co., Ltd., Tokyo (JP)

(*) Notice: Subject to any disclaimer, the term of this patent is extended or adjusted under 35 U.S.C. 154(b) by 248 days.

(21) Appl. No.: 09/727,579

(22) Filed: Dec. 4, 2000

(65) Prior Publication Data

US 2001/0003626 A1 Jun. 14, 2001

(30) Foreign Application Priority Data

Dec. 3, 1999 (JP) .......................................... 11-344829

(51) Int. Cl.[7] ............................ B32B 5/16; B32B 27/30

(52) U.S. Cl. ................. 428/330; 427/393.5; 427/412.3; 428/325; 428/331; 428/341; 428/520; 428/522; 428/910

(58) Field of Search ................................ 428/325, 330, 428/331, 341, 520, 522, 910; 427/393.5, 412.3

(56) References Cited

U.S. PATENT DOCUMENTS

| | | | | | |
|---|---|---|---|---|---|
| 5,233,924 | A | * | 8/1993 | Ohba et al. | 101/483 |
| 5,336,657 | A | | 8/1994 | Egashira et al. | 503/227 |
| 5,545,606 | A | | 8/1996 | Takiguchi et al. | 503/227 |
| 5,776,604 | A | | 7/1998 | Lu et al. | 428/343 |
| 5,891,552 | A | | 4/1999 | Lu et al. | 428/195 |

FOREIGN PATENT DOCUMENTS

| | | |
|---|---|---|
| EP | 0 102 209 | 3/1984 |

* cited by examiner

*Primary Examiner*—D. S. Nakarani
(74) *Attorney, Agent, or Firm*—Oblon, Spivak, McClelland, Maier & Neustadt, P.C.

(57) ABSTRACT

A coated film comprises a thermoplastic resin support film (I), a primer coating layer (II) on at least one surface of the support (I), and an ink absorbing layer (III) comprising at least three kinds of inorganic pigments and a binder resin, coated onto the primer coating layer (II). The coated film of the present invention may be offset printed and printed with a thermal melt transfer or impact dot printer.

21 Claims, 1 Drawing Sheet

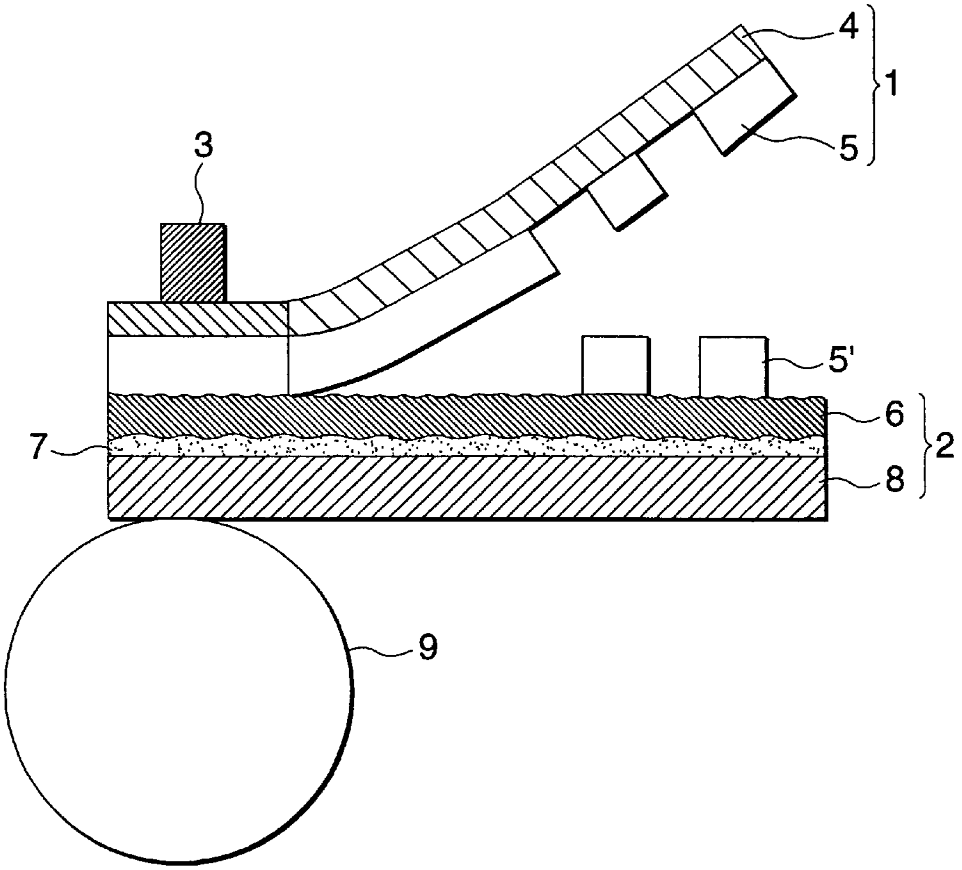
4
1
3
5
5'
6
7
2
8
9

COATED FILM

BACKGROUND OF THE INVENTION

1. Field of the Invention

The present invention is a coated film suitable for printing both letters and images (setting and printing), which has excellent printability using a melt thermal transfer or dot impact printer, and which is also offset printable.

2. Description of the Related Art

A melt thermal transfer printing system utilizing a thermal transfer ink sheet and a thermal head is mechanically simple and easy to maintain, and therefore has been widely used in various kinds of printers. High quality paper has been used as an image receiving sheet. Supports for the thermal transfer image receiving sheet include, for example used pulp paper; opaque synthetic paper comprising an oriented (i.e., stretched) film of propylene-based resin containing a finely divided inorganic powder such as calcined clay or calcium carbonate; and a pigment-coated type synthetic paper made by coating a pigment coating agent containing finely divided white inorganic powder and a resin binder onto a transparent polyethylene terephthalate oriented film or a transparent polyolefin film to improve the degree of whiteness and dyeability. When the thermal transfer image receiving sheet is used as a drum or container label, or as an airline shipment tag, a pressure-sensitive adhesive is coated onto the surface of the label or tag, which is opposite to the image receiving layer (back surface) of the support. The pressure-sensitive adhesive coating is also usually covered with a release paper. The release paper is peeled off before the label is adhered to a product, or before the airline shipment tag is adhered to luggage.

Labels are typically preprinted on the surface of a plastic films or paper with a frame pattern, ruled line, trade name, address, company name, etc., and optionally with specific information such as lot number, production date, bar code, etc. More recently, personal computers have been used for entered and printing such information on labels, using, for example, a melt thermal transfer printer, a wire dot printer or an ink jet printer. Thus, plastic film and paper media should be readily printed using these types of printers. Generally, paper has good printing qualities and may be used with the various kinds of printers. However, paper cannot be used if water resistance and strength are required. For these applications, plastic film has excellent water resistance and strength, but it is sometimes difficult to print on plastic using various kinds of printers. Offset printing is an inexpensive and simple printing method which generally provides clear images having the desired gradations in image density. Therefore, it is desirable to use offset printing methods to print on plastic fills. However, the inks commonly used in offset printing dry and harden at an extremely slow speed. Furthermore, since plastic films typically do not have a structure capable of absorbing ink, the ink has poor adhesion to the plastic films, and is readily peeled off. Thus, offset printing of plastic film mm is difficult.

In order to overcome these disadvantages, the present invention provides a coated film surface treated so that it can be offset printed, and also printed with thermal transfer and dot impact printers.

SUMMARY OF THE INVENTION

The present invention is a thermoplastic resin film substrate comprising an ink absorbing layer, which is suitable for melt thermal transfer printing, dot impact printing, and offset printing. The coated film of the present invention comprises a thermoplastic resin film as a support (I) having a primer coating layer (II) provided on at least one surface thereof, and further having an ink absorbing layer (III) comprising at least three kinds of inorganic pigments and a binder resin provided on the primer coating layer (III).

The ink absorbing layer (III) preferably comprises 50 to 70% by weight of inorganic pigments and 30 to 50% by weight of the binder resin. The inorganic pigment formulation may be, for example, calcium carbonate, kaolin clay and amorphous silica, preferably having weight ratios ranging from 2:1:2 to 2:3:2. It is preferable that the inorganic pigments include at least one inorganic pigment having an oil absorption of 40 to 80 ml/100 g (JIS K-5101), in an amount of 30 to 50% by weight, based on the total weight of the inorganic pigments, and include an amorphous silica having a specific surface area of 280 to 450 $m^2/g$ and a pore volume of 0.9 to 1.65 ml/g (BET method) in an amount of 15 to 20% by weight based on the total weight of the inorganic pigments.

BRIEF DESCRIPTION OF THE DRAWING

FIG. 1 shows the cross section of a melt thermal transfer printing system.

DETAILED DESCRIPTION OF THE INVENTION (I) Support

The support is a thermoplastic resin film or an oriented thermoplastic resin film, preferably containing a finely divided inorganic or organic powder. The film has small voids produced by orienting the film and therefore has a degree of opacity of 65% or more, preferably 85% or more (JISP-8138), and a degree of whiteness of 80% or more, preferably 95% or more (JISP-8123). The oriented porous resin film may also be a laminated pulp paper, plane weave fabric (ponzee) or nonwoven fabric (spunbond). The void volume of the oriented porous resin film is 10 to 60%, preferably 15 to 45%, calculated by the following formula (1):

$$\text{Void volume } (\%)=\rho_0-\rho_1)/\rho_0\times 100 \quad (1)$$

$\rho_0$: density of resin film before orienting $\rho_1$: density of resin film after orienting Examples of the oriented $p_0$porous thermoplastic film support of the present invention includes the following (1) to (3):

(1) A finely-porous, propylene resin based biaxially oriented film containing 8 to 65% by weight of a finely divided inorganic or organic powder (see, for example JP-B-56-55433, U.S. Pat. No. 4,483,965). The term "JR-B" as used herein means an unexamined published Japanese patent application.

For example, such a film may be a uniaxially oriented thermoplastic resin film containing 0.3 to 5% by weight of a reflective white pigment such as titanium oxide and zinc oxide and 10 to 60% by weight of a finely divided white inorganic powder selected from the group consisting of calcium carbonate, calcined clay, silica and zeolite, laminated on both surfaces (upper and back surfaces, B and B') to a biaxially oriented thermoplastic resin film substrate layer (A) containing 5 to 40% by weight of a white inorganic finely divided powder.

(2) Synthetic paper comprising a biaxially oriented thermoplastic resin film substrate layer, to which is laminated paper-like surface layers of a uniaxially oriented thermoplastic resin film containing 8 to 65% by weight of a finely divided inorganic powder (JP-B-46-40794, JP-A-57-149363, JP-A-57-181829, U.S. Pat. No. 3,765,999). The term "JP-A" as used herein means an unexamined published Japanese patent application.

(3) A three-layered synthetic paper, made, for example, by melt laminating a propylene-based resin containing 8 to 65% by weight of a finely divided inorganic powder onto both surfaces of a substrate film obtained by uniaxially orienting a propylene-based resin film layer containing 5 to 40% by weight of a finely divided inorganic powder at a temperature lower than the melting point of the resin itself, then orienting the resulting laminated film in the direction perpendicular to the above-described direction. The product laminated film comprises a uniaxially oriented paper-like layer, and also comprises many fine voids. The substrate layer may also include biaxially oriented laminated films.

Finely Divided White Inorganic Powder

The finely divided inorganic powder of substrate layer (A) is not particularly limited. The finely divided inorganic powder of the present invention is preferably heavy calcium carbonate, light calcium carbonate, calcined clay, talc, titanium oxide, barium sulfate, zinc oxide, magnesium oxide, diatomaceous earth and oxidized diatomaceous earth, each having an average particle diameter of 0.1 to 10 μm, preferably 0.1 to 3 μm. Light or heavy calcium carbonate, calcined clay, diatomaceous earth and titanium oxide are particularly preferred, because they are inexpensive and readily form voids in the thermoplastic resin film during orientation and molding.

Finely Divided Organic Powder

The finely divided organic powder of substrate layer (A) is not particularly limited. However, the finely divided organic powder is preferably a resin which is different from main component of the thermoplastic resin film, and has an average particle diameter of 0.1 to 10 μm, preferably 0.1 to 3 μm after dispersion. For example, if the thermoplastic resin film is an olefinic resin film, polyethylene terephthalate, polybutylene terephthalate, polycarbonate, nylon-6, nylon-6,6, cyclic olefin, homopolymer of cyclic olefin and copolymer of cyclic olefin and ethylene, each having a melting point of 120° C. to 300° C. and a glass transition temperature of 120° C. to 280° C. may be used as the finely divided organic powder.

When this finely divided organic powder is formulated and kneaded into an olefinic resin, a dispersant, an antioxidant, an ultraviolet stabilizer and a compatibilizing agent may also be added to the composition, as necessary. It may be particularly important to add the correct amount and type of compatibilizing agent, because the compatibilizing agent determines the particle form of the organic finely divided powder.

Thermoplastic Resin

Examples of the thermoplastic resin include ethylene-based resins such as high-density polyethylene, medium-density polyethylene; propylene-based resins; polyolefin-based resins such as polymethyl-1-pentene and ethylene-cyclic olefin copolymer; polyamide-based resins such as nylon-6, and nylon-6,6; thermoplastic polyester-based resins such as polyethylene terephthalate and aliphatic polyesters; and thermoplastic resins such as polycarbonate, atactic polystyrene and syndiotactic polystyrene; and any mixture of the above resins.

The preferred thermoplastic resins are nonpolar polyolefin-based resins. In particular, propylene-based resins are particularly preferred because they are inexpensive and have good chemical resistance. Especially preferred propylene-based resins, include polypropylene, i.e., an isotactic or syndiotactic homopolymer of propylene having varying degrees of stereo-regularity, and copolymers of propylene (main monomer) with an α-olefin such as ethylene, butene-1, hexane-1, heptane-1 and 1,4-methyl pentene-1. These copolymers can contain two, three, or four different monomers, and a random copolymer or a block copolymer structure. Furthermore, it is preferable that the resin have a lower melting point than that of a propylene homopolymer. For example, 2 to 25% by weight of a high-density polyethylene or a low-density polyethylene may be added to the thermoplastic resin formulation.

Molding of Resin Film

The method of molding the thermoplastic resin film is not particularly limited, and various known methods may be used. For example, the thermoplastic resin film may be cast molded by extruding the thermoplastic resin in the form of a sheet using an extruder equipped with a mono-layered or multi-layered T die or I die, calender molding, rolling molding, inflation molding, cast molding or calender molding a mixture comprising a thermoplastic resin and an organic solvent or an oil, followed by removal of the solvent or the oil, and molding by solution casting a thermoplastic resin dissolved or suspended in a solvent, followed by removing the solvent.

Various known methods may be used to orient (i.e., stretch) the thermoplastic resin film. Specific examples include longitudinal orientation using rolls with different circumferential speeds and lateral orientation using a tenter oven.

Orientation Methods

Various known methods may be used for orienting the thermoplastic resin film. If an amorphous resin is used, orientation is carried out at a temperature greater than or equal to the glass transition temperature of the thermoplastic resin. If a crystalline resin is used, orientation is carried out at a temperature greater than or equal to the glass transition temperature of the amorphous portion of the resin, up to the melting point of a crystalline portion of the resin, i.e., in a temperature range that is known to be suitable for the respective thermoplastic resins. Specifically, the thermoplastic resin films may be oriented, for example by longitudinal orienting using rolls with different circumferential speeds, lateral orienting using a tenter oven, rolling, and simultaneous biaxial orienting combining a tenter oven and a linear motor.

The amount of orientation is not particularly limited and may be determined by the nature of the application and properties desired for thermoplastic resin used. For example, if a propylene homopolymer or propylene copolymer is used, the amount of uniaxial orientation is about 1.2 to 12 fold, preferably 2 to 10 fold (i.e., the amount of uniaxial orientation is the ratio of the length of the film after orientation relative to the length before orientation, measured in the direction of orientation). For biaxial oriented film, the amount of biaxial orientation is 1 5 to 60 fold, preferably 10 to 50 fold (i.e., the amount of biaxial orientation is the ratio of the area of the film after biaxial orientation relative to the area of the film before orientation). If thermoplastic resins other than propylene homopolymers or copolymers are used, the amount of uniaxial orientation is about 1.2 to 10 fold, preferably 2 to 5 fold, while the amount of biaxial orientation is 1.5 to 20 fold, preferably 4 to 12 fold. If necessary, the oriented film may then be thermally treatment at a high temperature.

The orientation temperature of the thermoplastic resin is 2 to 60° C. lower than its melting point. For example, if the thermoplastic resin is a propylene homopolymer having a melting point of 155 to 167° C., the orientation temperature may be 152 to 164° C. If the thermoplastic resin is a high-density polyethylene having a melting point of 121 to 134° C., the orientation temperature may be 110 to 120° C. If the resin is polyethylene terephthalate having a melting point of 246 to 252° C., the orientation temperature may be 104 to 115° C. The rate of orientation may be 20 to 350 m/min.

Layer Construction

The themoplastic resin film may have a monolayer structure or a multilayered structure.

For example, a mononolayer polyolefin-based resin support can be prepared by uniaxial or biaxial orientation of a resin film containing 40 to 99.5% by weight of a polyolefin-based resin and 60 to 0.5% by weight of a finely divided inorganic powder, at a temperature lower than the melting point of the polyolefin-based resin (preferably 3 to 60° C. lower than the melting point). A support film having a multilayered structure can be prepared by orientation of the above-described resin film in the longitudinal direction at a temperature lower than the melting point of the polyolefin-based resin (preferably 3 to 60° C. lower than the melting point), then laminating a resin film consisting of a resin composition containing 25 to 100% by weight of a polyolefin-based resin and 75 to 0% by weight of an inorganic finely divided powder on at least one surface of the oriented film. The surface layer laminated onto the oriented film can be an unoriented resin layer.

A particularly preferable support film may be obtained by uniaxial orientation of a polyolefin resin film comprising 8 to 65% by weight of an finely divided inorganic powder such as calcined clay, calcium carbonate, diatomaceous earth, barium sulfate, silica, titanium oxide and talc, thereby forming many cracks in the films mainly consisting of the inorganic finely divided powder inside the film. As a result, the support film is translucent or non-transparent film. A resin composition comprising 0.5 to 65% by weight of the finely divided inorganic powder is then laminated onto the support film. The laminated film is then oriented in the direction perpendicular to the direction in which the support was uniaxially oriented.

The thickness of the support used in the present invention is usually 20 to 350 μm, preferably 35 to 300 μm.

Primer Coating Layer (II)

A primer coating layer (II), which facilitates the adhesion of the support layer (I) with an ink absorbing layer (III) and also improves the handling properties of the coated film, is prepared by coating an aqueous solution of a composition obtained by mixing:

(a) 100 parts by weight of quaternary nitrogen-containing acrylic-based resin which is an amphoteric compound formed by quaternizing (e.g., with an alkyl halide or an acid) a tertiary nitrogen atom of a polymer obtained by copolymerizing the following monomers (i), (ii) and (iii):

(i)

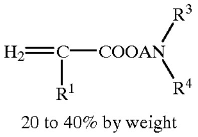

20 to 40% by weight

-continued (ii)

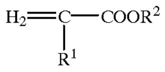

6 to 80% by weight (iii)

another hydrophobic vinyl monomer 0 to 80% by weight (in respective formulae above, $R^1$ represents H or $CH_3$, $R^2$ represents an alkyl group having 1 to 18 carbon atoms, $R^3$ and $R^4$ each represents H or an alkyl group having 1 to 2 carbon atoms, A represents an alkylene group having 2 to 6 carbon atoms.); with (b) 20 to 300 parts by weight of a polyamine-based compound selected from a group consisting of polyethyleneimine, poly(ethyleneimine-urea) and an ethyleneimine adduct of polyaminepolyamide, or an alkyl-modified polyamine-based compound, an alkenyl-modified polyamine-based compound, a benzyl-modified polyamine-based compound or an aliphatic cyclic hydrocarbon-modified polyamine-based compound; and (c) 20 to 300 parts by weight of an epichlorohydrin adduct of polyaminepolyamide. The coating formulation described above may be applied on one or both surfaces of the support layer (I), then dried.

The quaternary nitrogen-containing acrylic-based resin, i.e., component (a), is a primer component which can also provide an antistatic effect. Component (a) may be any quaternary nitrogen-containing acrylic-based resin as described above, for example, the resin described in JP-B-2-2910.

Examples of monomer (ii) may include any suitable acrylate or methacrylate ester, for example, ethyl acrylate, propyl acrylate, butyl acrylate, capryl acrylate and stearyl methacrylate.

Examples of the hydrophobic vinyl monomer (iii) may include styrene and vinyl chloride.

The polyamine-based compound, i.e., component (b), is a primer component which can enhance adhesion. For example, the polyamine-based compound may be selected from the group consisting of polyethyleneimine and an ethyleneimine adduct of polyaminepolyamide, or an alkyl-modified polyethyleneimine, an alkyl-modified ethyleneimine adduct of polyaminepolyamide, alkenyl-modified polyethyleneimine, alkenyl-modified ethyleneimine adduct of polyaminepolyamide, benzyl-modified polyethyleneimine, benzyl-modified ethyleneimine adduct of polyaminepolyamide, aliphatic cyclic hydrocarbon-modified polyethyleneimine, or aliphatic cyclic hydrocarbon-modified ethyleneimine adduct of polyaminepolyamide, and poly(ethyleneimine-urea), represented by the following general formula (1) (JP-B-2-2910, JP-A-1-141736):

(1)

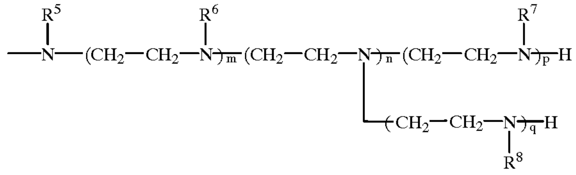

wherein $R^5$ to $R^8$ each independently represent H, an alkyl group or alkenyl group having 1 to 24 carbon atoms, an aliphatic cyclic hydrocarbon group or a benzyl group, m represents an integer of 0 to 300, n,p and q each represents an integer of 1 to 300.

The polyaminepolyamide.epichlorohydrin adduct, i.e., component (c), is also a primer for enhancing adhesion. Component (c) is preferably a water-soluble and cationic thermoplastic resin obtained by reacting a polyamide prepared from a saturated dibasic carboxylic acid having 3 to 10 carbon atoms and a polyalkylene polyamine, with epichlorohydrin. Such a thermoplastic resin is described, for example, in JP-B-35-3547.

The above-described saturated dibasic carboxylic acid having 3 to 10 carbon atoms, may be, for example, a dicarboxylic acid having 4 to 8 carbon atoms, preferably adipic acid.

Specific examples of the above-described polyalkylene polyamine, are, for example, polyethylene polyamine, particularly ethylenediamine, diethylenetriamine and triethylenetetramine, and particularly preferably diethylenetriamine.

In addition, the primer coating layer may also contain inorganic compounds such as sodium carbonate, sodium sulfate, sodium sulfite, sodium thiosulfate, barium hydroxide, sodium metasilicate, sodium pyrophosphate ($Na_4P_2O_7.10H_2O$), sodium tripolyphosphate ($Na_5P_3O_{10}.6H_2O$), monobasic sodium phosphate ($NaH_2PO_4.2H_2O$), potassium alum ($KAl(SO_4)_2.12H_2O$) and ammonium alum ($Al(NH_4)(SO_4)_2.12H_2O$).

These components (a), (b) and (c) are mixed together in an aqueous solution to form a primer coating composition having a solids content of typically 0.1 to 10% by weight, preferably 0.1 to 5% by weight, based on the weight of the coating composition.

The amount of primer coating composition coated onto a propylene-based resin support film (I), is generally 0.005 to 10 $g/m^2$, preferably 0.02 to 5 $g/m^2$. Any conventional coating method or coating equipment may be used to coat the primer onto the support film, for example, roll, blade, air knife and size press coating equipment.

The ratio of these components (a), (b) and (c) in the primer coating composition is as follows, based on 100 parts by weight of component (a), a nitrogen-containing acrylic-based resin: 20 to 300 parts by weight, preferably 20 to 100 parts by weight of component (b), a polyamine-based compound, and 20 to 300 parts by weight, preferably 35 to 200 parts by weight of component (c), an epichlorohydrin adduct of a polyaminepolyamide. This primer coating composition provides and enhances antistatic properties, and ink adhesion of the absorbing layer (III).

Ink Absorbing Layer(III)

An acrylic ester polymer and acetacetylated vinyl copolymer may be employed as a binder resin in the present invention. Any conventional acrylic ester-based resin binder may be employed, including, for example, binders containing alkyl esters of acrylic and/or methacrylic acid (i.e., methyl, ethyl, propyl, butyl esters, etc.). The acrylic-ester based binder resin may be in the form of an emulsion, dispersion, powder, or dissolved in an organic solvent. In addition, the binder may include a styrene.acrylic alkylester copolymer, polyvinyl alcohol, ethylene.vinyl alcohol copolymer comprising a silanol group, polyvinyl pyrrolidone, ethylene.vinyl acetate copolymer, methylethyl cellulose, sodium polyacrylate, starch, polyethylene polyamine, polyester, polyacrylamide, vinyl pyrrolidone, vinyl acetate copolymer, ester.ether-based urethane resin, or ester-based urethane resin. In addition, the binder may also contain light calcium carbonate, kaolin clay, or amorphous silica, and optionally, titanium oxide, zinc oxide or a plastic pigment such as crosslinked polymethyl methacrylate acrylic resin filler or hollow polystyrene filler. Furthermore, an ink setting agent, ultraviolet absorber, or surfactant may optionally be added. The binder resin is used in an amount of 30 to 50% by weight, preferably 40 to 50% by weight, and the inorganic pigment is used in an amount of 50 to 70% by weight, preferably 50 to 60% by weight, based on the total weight of the ink absorbing layer (III).

In order to facilitate ink reception, an inorganic pigment may be employed such as calcium carbonate together with kaolin clay. Inorganic pigments having an oil absorption of 40 to 100 ml/100 g, preferably 40 to 60 ml/100 g (JIS K-5101) in an amount of 30 to 50% by weight, based on the total weight of ink absorbing layer (III) (60 to 72% by weight of the inorganic pigment), and an amorphous silica produced by the gelation method, having a specific surface area of 280 to 450 $m^2/g$ and a pore volume of 0.9 to 1.65 ml/g, preferably 0.9 to 1.20 ml/g (according to BET method) in an amount of 15 to 20% by weight, based on the total weight of ink absorbing layer (III) (28 to 40% by weight of the inorganic pigment) are preferably used as a mixture. In other words, in order to obtain a tough surface and dense voids suitable for absorbing ink, a mixture of calcium carbonate, kaolin clay and amorphous silica produced by gelation method is preferred. When the ink absorption of calcium carbonate and kaolin clay in an ink absorption layer is 40 ml/100 g or less, the ink reception property of the layer is poor. When the ink absorption exceeds 100 ml/100 g, the ink adhesion and a rub resistance of the layer become poorer. The amorphous silica produced by a gelation method, having a specific surface area of 280 to 450 $m^2/g$ and a pore volume of 0.9 to 1.65 ml/g can absorb ink and enhance ink drying, and, at the same time, form a strong ink absorption layer to improve ink adhesion. When the pore volume is 0.9 ml/g or less, voids for forming secondary particles are reduced, which results in a decrease in ink absorption. When the pore volume exceeds 1.65 ml/g, large primary particles are formed so that secondary particles may have a relatively loose structure. As the result, the particle diameter becomes large, and a dense and strong ink absorbing layer is not formed. Furthermore, large pore volumes decrease ink adhesion and rub resistance, and it is difficult to increase the transfer of higher concentrations of ink.

Example of the ink setting agent include tertiary ammonium salts of polyethyleneimine, an acrylic copolymer comprising a quaternary ammonium group, and an epichlorohydrin adduct of polyaminepolyamide.

An ink absorbing layer is formed on a support (I) by coating the ink absorbing layer coating composition, as described above, onto a primer coating layer (II) formed on the surface of tie support (I), followed by drying. The amount of ink absorbing layer may be 0.5 to 50 $g/m^2$, preferably 1 to 30 $g/m^2$ (weight of solids after drying). The ink absorbing layer may be coated using any conventional coating method and apparatus, such as the Mayer bar system, gravure roll system, reverse roll system, blade system, knife system, air knife system, slit die system and gate roll system. The coated ink absorbing layer may then be dried using conventional drying methods.

Optionally, the surface of the dried coating layer -may be subjected to a super calender treatment so that the ink absorbing layer may be smooth.

Melt Thermal Transfer Sheet

In order to form an image by transferring a transfer ink to the above-described ink absorbing layer (III), various kinds of melt thermal transfer sheet may be used. Specifically, the melt thermal transfer sheet may comprise mainly a binder component and a colorant, and optionally, additives such as a softening agents a plasticizer, a melting point controller, a smoothing agent and a dispersant, laminated onto a substrate layer comprising a polyester film.

Specific examples of the binder component include well-known waxes such as paraffin wax, carnauba wax and ester wax, and various kinds of high-molecular substances having a low melting point; and examples of the colorant may include carbon black, various kinds organic and inorganic pigments and dyes.

Melt Thermal Transfer Printer

As shown in FIG. 1, a melt thermal transfer system comprises a thermal transfer ink ribbon (1) comprising a thermally melting ink (5) and a substrate (4), and a coated film (2), which are interposed into a narrow gap between a platen roll (9) and a heat source (e.g., thermal head) (3). When the thermally melting ink (5) is heated by the heat source (3) which can be controlled by electrical signals (i.e., a thermal head), the melted ink is transferred (5' is the transferred ink) directly to the coated film (2). In FIG. 1, (6) denotes an ink absorbing layer, (7) denotes a primer layer, and (8) denotes a support.

Having generally described this invention, a further understanding can be obtained by reference to certain specific examples which are provided herein for purposes of illustration only, and are not intended to be limiting unless otherwise specified.

Production Example of Support

PREPARATION EXAMPLE 1

(1) A mixture (A) comprising 72% by weight of polypropylene homopolymer having MFR of 0.8 g/10 min., 15% by weight of a high-density polyethylene and 13% by weight of a calcium carbonate powder having a particle diameter of 1.5 μm was melted and kneaded through an extruder, then the resulting kneaded product was extruded through a die in the form of a sheet. The sheet thus obtained was cooled by means of a cooling device to obtain an unoriented sheet, which was then heated to 145° C., then oriented. 5-fold in the longitudinal direction.

(2) A composition for surface layer (B) comprising 55% by weight of a polypropylene homopolymer having MFR of 4.0 g/10 min. and 45% by weight of a calcium carbonate powder having a particle diameter of 1.5 μm was kneaded and extruded through an extruder set at 270° C. to form a sheet. The sheet thus obtained was laminated onto both sides of the 5-fold oriented sheet obtained above in process (1), cooled to 60° C., then heated again to 160° C. and oriented 7.5-fold in the lateral direction by means of a tenter. A three-layered film was obtained.

(3) The surface of the three-layered film obtained in process (2) was subjected to corona discharge treatment. The resulting laminated product had a three-layered structure, (B)/(A)/(B), and the respective layers had thicknesses of 15/50/15 μm (80 μm in total). The resulting film had the following physical properties: void volume of 32%, density of 0.77 g/cm$^3$, degree of whiteness of 95% and opacity of 90%.

PREPARATION EXAMPLE 2

(1) A composition (A) was obtained by melting and mixing 80% by weight of a propylene homopolymer (melting point 164° C.) having MFR of 1.2 g/10 min., 3.5% by weight of a high-density polyethylene, 16% by weight of calcium carbonate having an average particle diameter of 1.5 μm and 0.5% by weight of titanium white through an extruder set at 270° C., thereby obtaining a resin mixture. A composition (B) was obtained by melting and mixing 55% by weight of a propylene homopolymer having MNR of 4.0 g/10 min., 44.5% by weight of calcium carbonate having an average particle diameter of 1.5 μm and 0.5% by weight of anatase-type titanium white through an extruder set at 270° C., thereby obtaining a resin mixture. These resin mixtures were then extruded through one main extruder and two secondary extruders, and the respective resin mixtures were combined and extruded through one T die head, thereby providing a laminated film in the form of sheet having three-layered structure.

(2) Tis laminated film having a three-layered structure was then cooled to 60° C. by a cooling roller and molded. The molded product was heated again to about 150° C. and oriented in the longitudinal direction, then annealed. The resulting molded product was oriented 7-fold in the longitudinal direction. Thereafter, the, oriented film was heated again to 160° C. and oriented 7-fold in the lateral direction by means of a tenter. The resulting oriented film was cooled to 65° C. and corona discharge treated. The film obtained was then slit to obtain a synthetic paper having three-layered structure and having a thickness of 120 μm (A/B/=20/80/20). The resulting film has the following physical properties; void volume of 30%, density of 0.79 g/cm$^3$, degree of whiteness of 95%, opacity of 89% and gloss of 91%.

Production Example of Primer Coating Composition

PREPARATION EXAMPLE 3

A primer coating composition was prepared having the following composition:

(a) 0.5 weight % of a terpolymer comprising the following units:

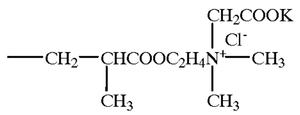

28 mol %

56 mol %

$—CH_2—CH_2—COOC_2H_4$ 16 mol %

$—CH_2—CH_2—COOC_{18}H_{37}$ 0.3% by weight of butylated polyethyleneimine;

(c) 0.5% by weight of an epichlorohydrin adduct of water-soluble polyaminepolyamide ("WS-570" trade name, produced by Nippon (Japan) PMC Co., Ltd.);

(d) and the balance water.

Production Example of Ink Absorbing Layer Coating Composition

PREPARATION EXAMPLE 4

A coating agent having the composition shown below was used (amounts based on amount of solids, after drying the coating). The ink absorbing coating composition was dispersed in water and the solid concentration was adjusted to 30% by weight with water.

Pigment and resin binder used were as follows:

Pigment 20 parts by weight of light calcium carbonate having an oil absorption of 44 ml/100 g (Brilliant S-15, produced by Shiraishi Kogyo);

10 parts by weight of kaolin clay having an oil absorption of 50 ml/100 g (U.W-90, produced by Engelhern K.K.);

19 parts by weight of silica produced by a gelation method having a pore volume of 0.9 ml/g (WSSG-IU, produced by Grace Japan);

1 part by weight of a finely divided organic powder (crosslinked PMMA, produced by Toshin Kagaku K.K.).

Binder 45 parts by weight of an acrylic ester-based resin emulsion ("Movineal 735" produced by Clariant Polymer K.K.); and 5 parts by weight of polyvinyl alcohol (Gosefimer Z-100, produced by Nippon Gosei Kagaku K.K.(Japan Synthetic Chemical K.K.).

EXAMPLE 1

The primer coating layer of Preparation Example 3 was coated on both sides of the film of Preparation Example 1 so that, after drying at 65° C., the amount of primer coating was 0.2 g/$m^2$ on each surface of the support film.

An ink receiving layer coating composition having the composition of Preparation Example 4 was then coated onto the dried primer layer, and dried at 110° C. so that the amount of ink receiving layer was 5.0 g/$m^2$. Thus, a coated film having the structure: ink absorbing layer/primer coating layer/synthetic paper/primer coating layer was obtained.

(1) Coated Film Adhesion Strength

The surface strength of the coated surface was determined using an Internal Bond Tester produced by Kumagaya Riki Kogyo. The results of this test are shown in Table 1.

<1> Melt Thermal Transfer Printer Suitability

Bar code printing was carried out in a room thermostatically controlled to a temperature of 35° C. and 85%RH, on the coated surface of the above-described coated film, using a "Bar Code Printer B-30-S5" (Teck Co., Ltd.) printing apparatus, and a thermomelting type ink ribbon "WAX type B110A" or "Resin-type B110C" (Trade name) (Rico Co., Ltd.). The results are shown in Table 1.

Evaluations (1) Evaluation of Printing

The printed bar code was visually evaluated according to the following criteria:

○: Bar code, solid, Clear image can be obtained in lettered portion;

Δ: Although blurring is observed in lettered portion, commercially acceptable;

X: Broken lines observed in bar code.

(2) Ink Adhesion

An adhesive tape "Cellotape LP-24™ (produced by Nichiban Co., Ltd.) was adhered on a printed surface, and rubbed five times using a gauze ball. The tape was gently pushing with the gauze in order to peel off the tape at an angle of 180°, and the adhesion strength was evaluated.

Adhesion of ink was evaluated according to the following criteria:

◎: No peeling of ink occurs;

○: Although a small amount of ink is peeled off, commercially acceptable adhesion;

Δ: Ink is partially removed (25% or less of the printed area);

X: 25% or more of the printed area peels off; and readout of the barcode is impossible.

<2> Dot Printer Suitability

On the coated surface of the above-described coated film, printing was carried out using an impact dot printing system printer "PC-PR101/63" produced by Nippon Denki Co., Ltd. and ribbon "PC201G-01" produced by Nippon Denki Co., Ltd. The results are shown in Table 1.

(1) Printing Properties were Visually Evaluated as Follows

◎: print concentration is high and no blurring or staining observed;

○: Clear printing obtained, no blurring of ink and printing is not stained;

Δ: Slight blurring of ink and also slightly stained printing;

X: Ink is severely blurred and printing is severely stained.

(2) At One Minute After Printing in (1), the Printed Area was Rubbed with a Tissue Paper and the Dryability (Adhesion) of the Ink was Visually Evaluated as Follows ◎: Clear printing, and ink does not soak into the tissue paper and the background of the printing is not stained;

○: Clear printing, although some ink slightly soaked into the tissue paper;

Δ: Background is slightly stained;

X: Background is stained stain and readout is difficult.

<3> Offset Printability

An offset printing machine RI tester produced by Mei Seisakusho was used as an offset printing machine, using oil ink "Best SP black™" produced by TOKA Co., Ltd., and the amount of ink transfer was 1.5 g/$m^2$. The results are shown in Table 1.

(1) Ink Adhesion

The transferred ink was allowed to stand for one day, then ink adhesion strength on a printed surface was determined by means of an Internal Bond Tester produced by Kumagaya Riki Kogyo.

(2) Ink Dryability

Immediately after transferring the ink, the transferred ink surface was set in an ink drying tester (Choyokaishiki) produced by Toyo Seiki, and the surface was visually evaluated as follows:

◎: Ink is slightly sticky, and after 1 to 2 hours, no ink is sticky;

○: Ink is slightly sticky, and after 3 to 4 hours, no ink is sticky;

Δ: In 3 to 4 hours, no ink is sticky;

X: Very sticky ink, and after 4 hours or more, no ink is sticky.

<4> Rub Resistance Evaluation

White cotton fabric was wetted with water and applied to the moving surface of the rub element of a rub tester "FR-2™" produced by Suga Shikenki Co., Ltd. and fixed thereon The tester was placed on a stand so that the moving surface of the rub element touched the printed surface of the sheet to which ink had been transferred in the above-described "offset printability" test. Furthermore, a 200 g load was applied. The printed surface was rubbed 500 times, and the stain on the printed surface and the stain on the white cotton fabric were visually evaluated as follows:

◎: Both the printed surface and white cotton fabric are substantially unstained;

○: Only the white cotton fabric is stained;

Δ: The printed surface is slightly stained and white cotton fabric is stained;

X: Both the printed surface and cotton white fabric are stained.

Comparative Example 1

A coated film was produced and evaluated as in Example 1 except that a primer coating layer was not provided, but the ink absorbing layer was coated directly on the film. The results are shown in Table 1.

EXAMPLES 2 to 4

Comparative Examples 2 to 7

Coated films were produced and evaluated as in Example 1 except that the films were changed as shown in Table 1 and the compositions of the ink absorbing layers were changed to those shown in Table 1 (the amount of the primer coating composition and that of the ink absorbing layer were the same as those of Example 1).

The pigment used in Comparative Example 5 was light calcium carbonate having an oil absorption of 120 ml/100 g (TM-123CS produced by Tama Kogyo);

The pigment used in Comparative Example 6 was silica obtained by precipitation (P-527, produced by Mizusawa Kagaku) having a pore volume of 0.13 ml/g;

The resin binder used in Comparative Example 7 was an ester-based urethane resin emulsion.

The results are shown in Table 1.

TABLE 1

| | Examples | | | | | | |
|---|---|---|---|---|---|---|---|
| | 1 | 2 | 3 | 4 | 5 | 6 | 7 |
| Production Example of Support (I) | Prep. Ex. 1 | Prep. Ex. 1 | Prep. Ex. 1 | Prep. Ex. 1 | Prep. Ex. 1 | Prep. Ex. 1 | Prep. Ex. 2 |
| Production Example of Primer layer (II) | Prep. Ex. 3 | Prep. Ex. 3 | Prep. Ex. 3 | Prep. Ex. 3 | Prep. Ex. 3 | Prep. Ex. 3 | Prep. Ex. 3 |
| Calcium carbonate (44 ml/100 g) | 20 | 20 | 20 | 20 | 20 | 20 | 20 |
| Calcium carbonate (120 ml/100 g) | — | — | — | — | — | — | — |
| Kaolin clay (50 ml/100 g) | 10 | 10 | 10 | 20 | 30 | 10 | 10 |
| Silica of gelation method (0.9 ml/g) | 19 | 19 | 19 | 19 | 19 | 19 | 19 |
| Silica of precipitation method (0.13 ml/g) | — | — | — | — | — | — | — |
| Acrylic ester resin | 45 | 45 | 45 | 35 | 25 | 45 | 45 |
| Ester-based urethane resin | — | — | — | — | — | — | — |
| Polyvinyl alcohol | 5 | 5 | 5 | 5 | 5 | 5 | 5 |
| Crosslinked PMMA | 1 | 1 | 1 | 1 | 1 | 1 | 1 |
| Coated amount ($g/m^2$) | 0.5 | 1 | 5 | 5 | 5 | 40 | 5 |
| Coated Film adhesion | 1.60 | 1.66 | 1.67 | 1.73 | 1.85 | 2.33 | 2.88 |
| Printability WAX ribbon | O | O | O | O | O | O | O |
| Resin ribbon | O | O | O | O | O | O | O |
| Adhesion WAX ribbon | O | ◎ | ◎ | ◎ | ◎ | ◎ | ◎ |
| Resin ribbon | O | ◎ | ◎ | ◎ | ◎ | ◎ | ◎ |
| Dot printer printability | O | O | O | O | O | ◎ | O |
| Dryability | O | O | ◎ | ◎ | ◎ | ◎ | ◎ |
| Offset printing adhesion | 1.60 | 1.65 | 1.67 | 1.63 | 1.53 | 1.98 | 1.43 |
| Dryability | O | O | ◎ | ◎ | ◎ | ◎ | ◎ |
| Rub resistance | O | O | ◎ | ◎ | ◎ | O | ◎ |

| | Comparative Examples | | | | | | | | |
|---|---|---|---|---|---|---|---|---|---|
| | 1 | 2 | 3 | 4 | 5 | 6 | 7 | 8 | 9 |
| Production Example of Support (I) | Prep. Ex. 1 | Prep. Ex. 1 | Prep. Ex. 1 | Prep. Ex. 1 | Prep. Ex. 1 | Prep. Ex. 1 | Prep. Ex. 1 | Prep. Ex. 1 | Prep. Ex. 1 |
| Production Example of Primer layer (II) | None | Prep. Ex. 3 | Prep. Ex. 3 | Prep. Ex. 3 | Prep. Ex. 3 | Prep. Ex. 3 | Prep. Ex. 3 | Prep. Ex. 3 | Prep. Ex. 3 |
| Calcium carbonate (44 ml/100 g) | 20 | 40 | 40 | 30 | — | 20 | 20 | — | 20 |
| Calcium carbonate (120 ml/100 g) | — | — | — | — | 20 | — | — | — | |
| Kaolin clay (50 ml/100 g) | 10 | 10 | 10 | 10 | 10 | 10 | 10 | — | 10 |
| Silica of gelation method (0.9 ml/g) | 19 | — | 19 | 9 | 19 | — | 19 | — | 19 |
| Silica of precipitation method (0.13 ml/g) | — | — | — | — | — | 19 | — | — | |

TABLE 1-continued

| | | | | | | | | | |
|---|---|---|---|---|---|---|---|---|---|
| Acrylic ester resin | 45 | 45 | 25 | 45 | 45 | 45 | — | — | 45 |
| Ester-based urethane resin | — | — | — | — | — | — | 45 | — | — |
| Polyvinyl alcohol | 5 | 5 | 5 | 5 | 5 | 5 | 5 | — | 5 |
| Crosslinked PMMA | 1 | — | 1 | 1 | 1 | 1 | 1 | — | 1 |
| Coated amount (g/m$^2$) | 5 | 5 | 5 | 5 | 5 | 5 | 5 | 0 | 60 |
| Coated Film adhesion | 0.20 | 1.65 | 1.75 | 1.62 | 1.63 | 1.63 | 1.80 | — | 2.87 |
| Printability WAX ribbon | O | O | O | O | O | O | O | Δ | O |
| Resin ribbon | O | Δ | O | Δ | O | O | O | Δ | O |
| Adhesion WAX ribbon | X | O | O | Δ | O | O | O | Δ | Δ |
| Resin ribbon | X | Δ | Δ | O | Δ | O | O | Δ | Δ |
| Dot printer printability | O | O | O | O | O | O | O | Δ | ◎ |
| Dryability | ◎ | X | ◎ | X | ◎ | O | X | X | ◎ |
| Offset printing adhesion | 0.20 | 1.68 | 1.55 | 1.48 | 1.53 | 1.53 | 1.65 | 1.62 | 1.98 |
| Dryability | O | X | O | X | O | Δ | X | X | ◎ |
| Rub resistance | X | X | Δ | Δ | Δ | Δ | O | X | Δ |

Thus, the present invention can provide a coated film capable of being applied to various printing systems (i.e., letter press, gravure, flexography, screen, electrophotography), which is suitable for melt thermal transfer printing, impact dot printing, and offset printing. The coated film of the present invention has excellent water resistance, and is particularly useful as a drum or container label, or as an advertising poster.

The priority document of the present application, Japanese patent application 11-344929 filed Dec. 3, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed as new and is intended to be secured by Letters Patent is:

1. A coated film, comprising:

a thermoplastic resin support film (I);

a primer coating layer (II) on at least one surface of the support (I); and an ink absorbing layer (III) comprising at least three kinds of inorganic pigments and a binder resin, on the primer coating layer (II), wherein the ink absorbing layer (III) comprises 50 to 70% by weight of the inorganic pigments and 30 to 50% by weight of the binder resin, based on the total weight of the ink absorbing layer, and wherein said inorganic pigments are calcium carbonate, kaolin clay and amorphous silica produced by a gelation method.

2. The coated film of claim 1, wherein the calcium carbonate, kaolin clay and amorphous silica produced by a gelation method, are present in a weight ratio of from 2:1:2 to 2:3:2.

3. The coated film of claim 1, wherein the ink absorbing layer (III) comprises 30 to 50% by weight of calcium carbonate and kaolin each having an oil absorption of 40 to 100 ml/100 g as measured by JIS K-5101; and 15 to 20% by weight of the amorphous silica produced by a gelation method, having a specific surface area of 280 to 450 m$^2$/g and a pore volume of 0.9 to 1.65 ml/g as measured by the BET method.

4. The coated film of claim 1, wherein the binder resin is an acrylic ester-based resin.

5. The coated film of claim 1, wherein the ink absorbing layer (III) is present in amount of 0.5 to 50 g/m$^2$.

6. The coated film of claim 1, wherein the thermoplastic resin support film (I) comprises a porous resin film.

7. The coated film of claim 6, wherein the thermoplastic resin support film (I) is a monolayer film.

8. The coated film of claim 6, wherein the thermoplastic resin support film (I) is a multilayer film.

9. The coated film of claim 6, wherein the porous resin film has a void volume of 10 to 60%.

10. The coated film of claim 6, wherein the porous resin film is an oriented film and has an opacity of 65 to 100% and a degree of whiteness of 80 to 100%.

11. The coated film of claim 1, wherein the thermoplastic resin support film (I) is uniaxially or biaxially oriented.

12. The coated film of claim 1, wherein the thermoplastic resin support film (I) comprises a non-polar polyolefin resin.

13. The coated film of claim 1, wherein the primer coating layer (II) is prepared by:

coating onto said support layer (I) an aqueous solution of a composition comprising a mixture of:

(a) 100 parts by weight of an amphoteric quaternary nitrogen-containing acrylic-based resin, obtained by copolymerizing 20 to 40% by weight of monomer (i), 6 to 80% by weight of monomer (ii) and 0 to 80% by weight of another hydrophobic vinyl monomer (iii):

(i)

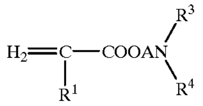

(ii)

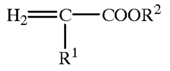

wherein $R^1$ is H or $CH_3$, $R^2$ represents an alkyl group having 1 to 18 carbon atoms, $R^2$ and $R^4$ each independently represent H or an alkyl group having 1 to 2 carbon atoms, and A represents an alkylene group having 2 to 6 carbon atoms, with (b) 20 to 300 parts by weight of a polyimine-based compound selected from the group consisting of polyethyleneimine, poly(ethyleneimine-urea), an ethyleneimine adduct of polyaminepolyamide, alkyl-modified polyethyleneimine, alkyl-modified poly (ethyleneimine-urea), alkyl-modified ethyleneimine adduct of polyaminepolyamide, alkenyl-modified polyethyleneimine, alkenyl-modified poly (ethyleneimine-urea), alkenyl-modified ethyleneimine adduct of polyaminepolyamide, benzyl-modified polyethyleneimine, benzyl-modified poly (ethyleneimine-urea), benzyl-modified ethyleneimine adduct of polyaminepolyamide, aliphatic cyclic hydrocarbon-modified polyethyleneimine, aliphatic cyclic hydrocarbon-modified poly(ethyleneimine-urea), aliphatic cyclic hydrocarbon-modified ethyleneimine adduct of polyaminepolyamide, and mixtures thereof; and (c) 20 to 300 parts by weight of an epichlorohydrin adduct of polyaminepolyamide; and drying the coated film.

14. The coated film of claim 1, wherein the primer coating layer (II) is present in the amount of 0.005 to 10 $g/m^2$.

15. A printed coated film comprising a coated film comprising:

a thermoplastic resin support film (I);

a primer coating layer (II) on at least one surface of the support (I); and an ink absorbing layer (III) comprising at least three kinds of inorganic pigments and a binder resin, on the primer coating layer (II), wherein the ink absorbing layer (III) comprises 50 to 70% by weight of the inorganic pigments and 30 to 50% by weight of the binder resin, based on the total weight of the ink absorbing layer, wherein said inorganic pigments are calcium carbonate, kaolin clay and amorphous silica produced by gelation method, and wherein said printed coated film is prepared by printing on said ink absorbing layer (III).

16. A method of making a coated film comprising orienting a thermoplastic resin support film (I) containing a finely divided inorganic or organic powder, thereby providing a porous resin film;

coating onto at least one surface of said porous resin film a primer coating layer (II);

drying the primer layer coated film;

coating onto at least one surface of said primer layer coated porous resin film an ink absorbing layer (III) comprising at least three kinds of inorganic pigments and a binder resin, wherein the ink absorbing layer (III) comprises 50 to 70% by weight of the inorganic pigments and 30 to 50% by weight of the binder resin, based on the total weight of the ink absorbing layer, wherein said inorganic pigments are calcium carbonate, kaolin clay and amorphous silica produced by gelation method; and drying the ink absorber layer coated film.

17. The method of claim 16, wherein the thermoplastic resin support film (I) is uniaxially oriented 1.2 to 10 fold.

18. The method of claim 16, wherein the thermoplastic resin support film (I) is biaxially oriented 1.5 to 60 fold.

19. The method of claim 16, wherein the primer coating layer comprises:

(a) 100 parts by weight of an amphoteric quaternary nitrogen-containing acrylic resin, obtained by copolymerizing 20 to 40% by weight of monomer (i), 6 to 80% by weight of monomer (ii) and 0 to 80% by weight of another hydrophobic vinyl monomer (iii):

(i)

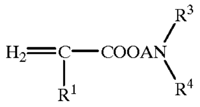

(ii)

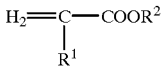

wherein $R^1$ is H or $CH_3$, $R^2$ represents an alkyl group having 1 to 18 carbon atoms, $R^3$ and $R^4$ each independently represent H or an alkyl group having 1 to 2 carbon atoms, and A represents an alkylene group having 2 to 6 carbon atoms, with (b) 20 to 300 parts by weight of a polyamine compound selected from the group consisting of polyethyleneimine, poly(ethyleneimine-urea), an ethyleneimine adduct of polyaminepolyamide, alkyl-modified polyethyleneimine, alkyl-modified poly (ethyleneimine-urea), alkyl-modified ethyleneimine adduct of polyaminepolyamide, alkenyl-modified polyethyleneimine, alkenyl-modified poly (ethyleneimine-urea), alkenyl-modified ethyleneimine adduct of polyaminepolyamide, benzyl-modified polyethyleneimine, benzyl-modified poly (ethyleneimine-urea), benzyl-modified ethyleneimine adduct of polyaminepolyamide, aliphatic cyclic hydrocarbon-modified polyethyleneimine, aliphatic cyclic hydrocarbon-modified poly(ethyleneimine-urea), aliphatic cyclic hydrocarbon-modified ethyleneimine adduct of polyaminepolyamide, and mixtures thereof; and (c) 20 to 300 parts by weight of an epichlorohydrin adduct of polyaminepolyamide.

20. The method of claim 16, wherein the calcium carbonate, kaolin clay and amorphous silica produced by gelation method, are present in a weight ratio of 2:1:2 to 2:3:2.

21. The method of claim 16, wherein the ink absorbing layer (III) comprises 30 to 50% by weight of calcium carbonate and kaolin each having an oil absorption of 40 to 100 ml/100 g as measured by JIS K-5101; and 15 to 20% by weight of the amorphous silica produced by a gelation method, having a specific surface area of 280 to 450 $m^2/g$ and a pore volume of 0.9 to 1.65 ml/g as measured by the BET method.

* * * * *